April 30, 1935. H. B. BATES Re. 19,548
RAIL AND WHEEL FLANGE LUBRICATOR
Original Filed Nov. 10, 1932 4 Sheets-Sheet 1
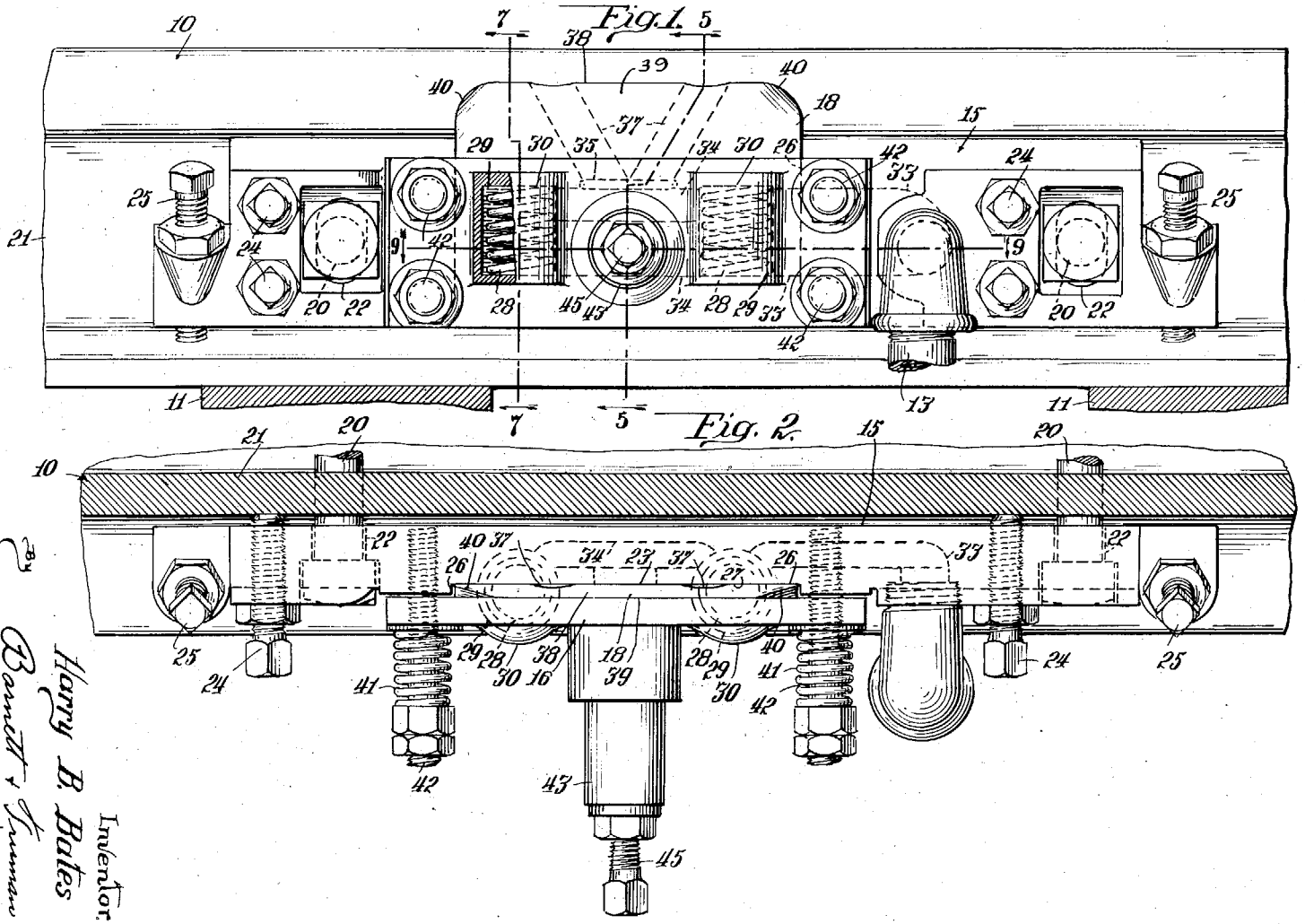
Inventor
Harry B. Bates
By Barnett & Truman
Attorneys.

April 30, 1935. H. B. BATES Re. 19,548
RAIL AND WHEEL FLANGE LUBRICATOR
Original Filed Nov. 10, 1932 4 Sheets-Sheet 2
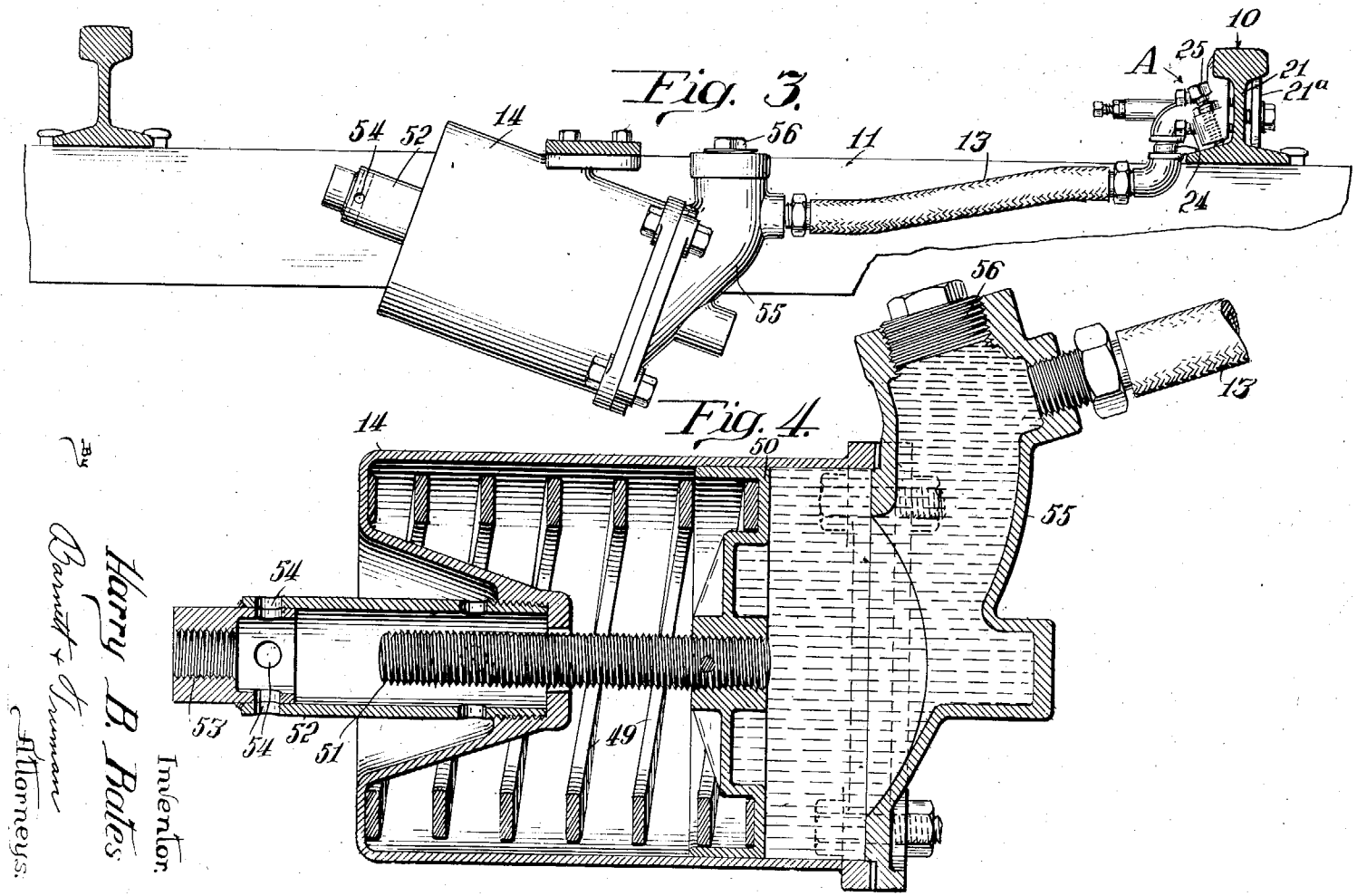
Inventor.
Harry B. Bates
By Barnett & Truman
Attorneys.

April 30, 1935. H. B. BATES Re. 19,548

RAIL AND WHEEL FLANGE LUBRICATOR

Original Filed Nov. 10, 1932 4 Sheets-Sheet 3

Inventor.
Harry B. Bates
By
Barnett & Truman
Attorneys.

April 30, 1935. H. B. BATES Re. 19,548

RAIL AND WHEEL FLANGE LUBRICATOR

Original Filed Nov. 10, 1932 4 Sheets-Sheet 4

Inventor.
Harry B. Bates
By Barnett & Truman
Attorneys.

Reissued Apr. 30, 1935

Re. 19,548

UNITED STATES PATENT OFFICE 19,548

RAIL AND WHEEL FLANGE LUBRICATOR

Harry B. Bates, Chicago, Ill., assignor to Maintenance Equipment Company, Chicago, Ill., a corporation of Illinois Original No. 1,979,307, dated November 6, 1934, Serial No. 642,014, November 10, 1932. Application for reissue December 29, 1934, Serial No. 759,807

16 Claims. (Cl. 184—3)

This invention relates to mechanical lubricators for railroad rails and more particularly to the class of such lubricators adapted to be actuated by car wheels passing along a rail to discharge lubricant in measured quantities onto the side of the rail head, whereby the lubricant is picked up by the wheel flanges and distributed along the inner face of the rail head.

In certain lubricating apparatus of the above general character the lubricant, containing entrained air, is compressed in a chamber of the discharge mechanism and is discharged therefrom by virtue of the expansive force of the lubricant when the discharge port is opened. In other devices of the above general character and particularly those devices adapted for using relatively non-compressible lubricants, the lubricant is discharged by means of pumps or plungers which are operated through connections with a wheel actuated member.

A principal object of the present invention is to provide, in a lubricator in which the lubricant for immediate use is segregated from the main source of lubricant supply and stored under pressure adjacent the rail, improvements whereby the apparatus can be readily and conveniently conditioned for the use of lubricants which vary in their extent of compression, and whereby the amount of lubricant discharged can be controlled in accordance with the character of the lubricant used and in accordance with the needs of the particular installation.

Another object of the invention is to provide an improved lubricator of the above character in which the amount of lubricant capable of being discharged during one cycle of operation of the discharge mechanism may be controlled by varying the size of the compression chamber in which the lubricant for immediate use is stored under pressure. In this connection the invention includes improved constructions whereby the lubricator is adaptable for use with a relatively non-compressible lubricant and contemplates means energized by the pressure on the lubricant in the supply chamber for discharging the lubricant therefrom.

Another object of the invention is to provide a lubricator device of the above character which can be applied to rails of different sizes and which by virtue of adjustable elements can be properly fitted to railroad rails even though such rail head has been worn along its inner face by the rubbing engagement of the wheel flanges.

The invention includes also as a specific object the provision of the various improved constructions, arrangements and combinations of parts and devices hereinafter described and claimed for carrying out the above stated objects and such other objects as will appear from the description of the invention.

In the drawings:

Fig. 1 is a side view of a lubricator constructed in accordance with the invention applied to the side of a railroad rail.

Fig. 2 is a plan view of the apparatus shown in Fig. 1, the head portion of the rail being cut away in this figure, for the purpose of clearness.

Fig. 3 is a cross-sectional view taken through a railway track showing the relative arrangement of the lubricant supply reservoir and the lubricant discharge mechanism.

Fig. 4 is a longitudinal sectional view taken through the lubricant supply reservoir.

Figure 5:
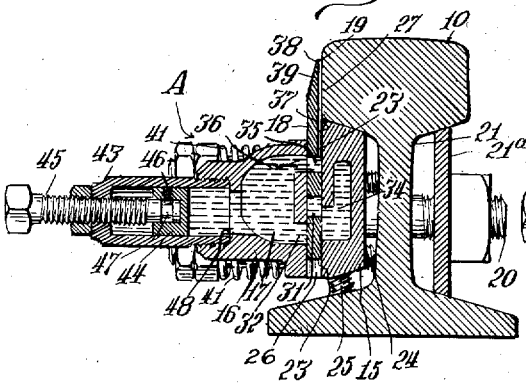
Fig. 5 is a cross-sectional view taken on line 5—5 of Fig. 1, showing the position of the parts when the lubricant discharge ducts are in communication, with the lubricant chamber from which such lubricant is discharged.
Figure 6:
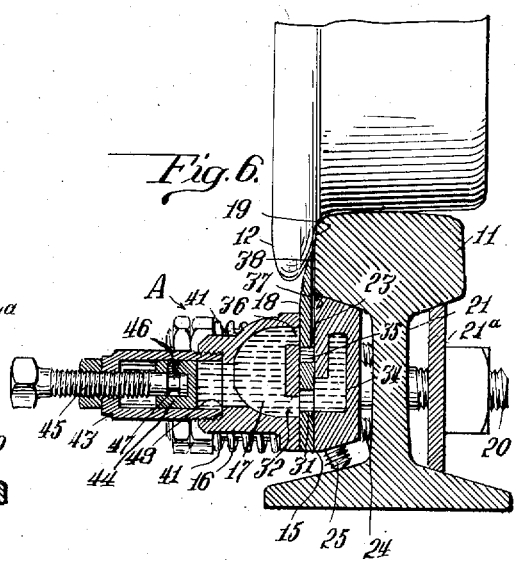
Fig. 6 is a view illustrating a cross-section similar to Fig. 5, but showing the valve plate depressed by the flange of a car wheel, during which period the auxiliary chamber, containing the immediate supply of lubricant, is re-charged with a full supply.
Figure 7:
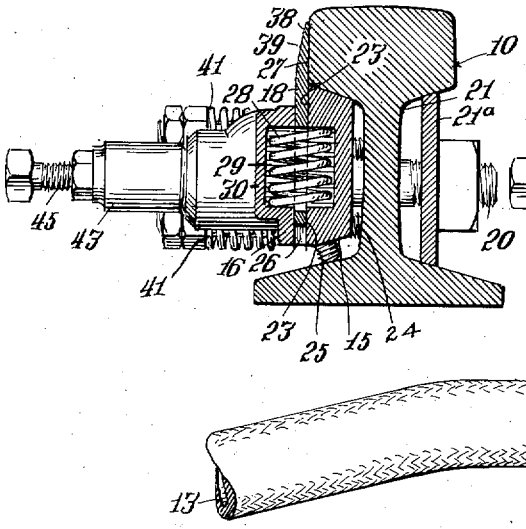
Fig. 7 is a vertical sectional view taken on line 7—7 of Fig. 1.
Figure 8:
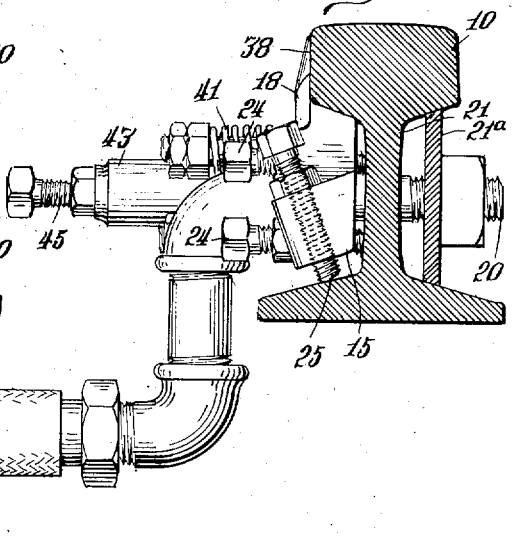
Fig. 8 is an end view of the lubricant discharge mechanism showing the means for adjusting said mechanism to rails of various sizes and contour.

Referring first to Figs. 1 to 9, inclusive, 10 designates a railroad rail which may be of any desired size or cross-sectional contour, 11 the cross ties on which the rail is supported and 12 indicates the usual flange of a car wheel positioned adjacent the inner side face of the rail head.

The embodiment of the invention shown in the above figures of the drawings comprises a lubricant discharging mechanism designated generally by the letter A, suitably clamped to one side of the railroad rail, and a lubricant supply reservoir located at a point remote from the lubricant discharge mechanism and connected therewith by means of a lubricant supply duct 13. In the present embodiment, the lubricant supply reservoir 14 is supported in the road-bed between the cross ties 11 and may be made of any suitable or desired size. If desired, the main reservoir can be located in the road-bed on the outside of the track rail. The supply lubricant duct 13 is made of flexible material, so as to permit the relative movements between the rail and supply reservoir. The supply reservoir 14 includes means therein for forcing the lubricant from the supply reservoir into the discharging mechanism from which it is later discharged in small quantities upon the side face of the track rail head where it is picked up by the wheel flanges and distributed along the inner face of the rail head to minimize wear on the wheel flanges and on the rail head.

The lubricant discharge mechanism may be described generally as consisting of a filler block 15 secured to the track rail in the space between the head and base flange of the rail, an outer member 16 having an auxiliary reservoir 17 for the immediate supply of lubricant, and a wheel actuated valve plate 18 interposed between the filler block 15 and the auxiliary reservoir. The said valve plate, in one position, establishes communication between the main and auxiliary reservoirs and in another position shuts off said communication between the reservoirs and opens a discharge port.

The filler block 15 is preferably clamped to the track rail by means of clamp bolts 20—20 which pass through the web 21 of the rail and clamping plates 21*a*—21*a* on the opposite side of the rail. The bolt openings 22—22 through the filler block 15 are preferably elongated so as to permit vertical adjustment of the filler block relative to the clamping bolts and thereby permit a filler block of one standard size to be applied to rails of various sizes. The said filler block 15 is also capable of lateral and angular adjustments relative to the rail so that the face 23 of the block can be positioned in the plane of the inner face 19 of the rail head. This adjustment is accomplished by means of spaced adjusting screws 24—24 at each end of the block adapted to bear against the web 21 of the rail. The upper edge of the filler block is forced tightly against the under surface of the rail head by means of the inclined adjusting screws 25—25 which bear on the base portion of the rail.

The valve plate 18 is seated in a recess 26 in the filler block 15 so that its inner face 27 will bear flat against said face 19 of the rail head. The valve plate 18 is supported in its normally elevated position by means of coil springs 28—28 positioned in openings 29 in the valve plate and retained in spring chambers 30—30. The valve plate is provided with an opening 31 which, when the plate is depressed, registers with an inlet port 32 of the auxiliary reservoir, whereby the lubricant in lubricant passages 33, 34 in the filler block may be forced into the auxiliary reservoir by reason of continuous pressure maintained in the main reservoir. When the valve plate is relieved from the pressure of the wheel flange 12, the springs 28—28 return the plate to its normally elevated position, thereby closing the inlet port 32 (see Fig. 5) and moving a discharge opening 35 in the valve plate into register with a discharge port 36 of the auxiliary reservoir. The inner face of the valve plate is provided with a plurality of grooves 37 leading from the opening 35 to the upper edge 38 of the valve plate. The said grooves are closed by the filler block 15 and the face 19 of the rail head and serve as discharge passages for the lubricant. The upper edge 38 of the valve plate is bevelled to form a wedge shaped portion 39 for engagement with the flanges 12 of the car wheels as they pass along the rail. The upper corner portions 40 of the plate, in addition to being bevelled to form wedge portions are also curved so as to minimize the impact of the initial contact of the wheel flanges with the valve plate.

The outer plate 16 is held in place and pressed resiliently against the outer face of the valve plate by means of coil springs 41—41 surrounding threaded studs 42. The springs 41 likewise hold the valve plate 18 against the face 23 of the filler block 15 with sufficient pressure to prevent escape of lubricant except through the passages 37—37.

The outer plate 16 is provided also with a cylindrical portion 43 which communicates with the auxiliary reservoir 17 and serves as a housing for an adjustable plunger 44. The plunger 44 may be set to any desired position in the housing by turning the adjustment screw 45 which is threaded through the end of the housing 43. The said plunger may be connected to the inner end of the screw 45 in any suitable manner. In the drawings, such connection is shown as consisting of a screw 46 extending through a wall of the plunger and projecting into a groove 47 formed in the inner end of the adjusting screw 45.

By shifting the position of the plunger 44 in the housing 43, the effective size of the auxiliary reservoir can be varied in accordance with the character of lubricant used and in accordance with the maximum amount of lubricant to be discharged for each operation of the discharge mechanism. For example, if a highly compressible lubricant is used, the plunger 44 may be moved toward its seat 48 so as to decrease the effective size of the auxiliary reservoir 17. In such case the reduction in the capacity of the auxiliary reservoir is compensated for by the greater expansion of the lubricant when the discharge port 36 is opened. It will be observed, from the above disclosure, that when using a less compressible lubricant, a like quantity of lubricant will be discharged onto the rail if the plunger 44 is moved outwardly to permit a larger body of lubricant to be stored under pressure in the auxiliary reservoir.

The pressure on the body of lubricant in the main reservoir 14 and in the supply ducts 13, 33 and 34 is maintained in the present embodiment by means of a spring 49 which exerts force on a piston 50 so as to force the lubricant into the discharge end of the reservoir and into the supply ducts 13, 33 and 34. The piston 50 carries a threaded stem 51 which projects out of the reservoir casing 14. A sleeve 52 is threaded in the rear head of the reservoir casing and serves as a housing for the portion of the stem 51 which projects out of the reservoir. The outer end of the sleeve 52 is provided with a threaded portion 53 adapted to fit the threaded stem 51. When it is desired to retract the piston 50 to its initial position, for example, during the refilling of the main reservoir, the sleeve 52 is removed and the threaded portion 53 thereof is threaded onto the end of the stem 51, so as to draw the piston 50 rearwardly toward the rear head of the reservoir. To facilitate turning the sleeve member 52 the sleeve is provided with apertures 54 adapted to receive a suitable tool or wrench. In order to facilitate the piston 50, the reservoir 14 is formed so as to normally assume an angular position in the roadbed, as shown in Fig. 3. The forward head of the reservoir is provided with an upturned spout 55 which is closed by a plug 56.

A summary of the operation of the lubricator mechanism above described is as follows:

Before filling the main reservoir 14, the piston 50 is retracted by the use of the threaded end 53 of the sleeve 52 and held in its retracted position until the reservoir is filled and the plug 56 is replaced in the spout 55. The sleeve 53 is then removed from the stem 51 and applied to the reservoir casing so as to serve as a housing for the stem 51 in the manner shown in Fig. 4. The pressure of the spring 49 maintains the entire body of lubricant in the main reservoir 14 and in the supply conduits 13, 33 and 34 under pressure. When the wheel actuated valve plate 18 is depressed from the position indicated in Fig. 5 to the position indicated in Fig. 6, a charge of lubricant is forced into the auxiliary chamber 17 and retained therein under pressure. When the actuating wheel flange passes off the valve plate 18 the springs 28—28 return the plate to the position shown in Fig. 5, whereupon opening 35 in the valve plate is in register with the discharge port 36. The expansive force of the lubricant held under compression in the auxiliary reservoir causes a quantity of the lubricant to flow through the discharge port 36 and channels 37—37 onto the inner face 19 of the rail head. The lubricant thus discharged is picked up by the flanges of the car wheels passing along the rail and re-applied to the rail at points remote from the discharge mechanism. The plurality of discharge passages in the discharge mechanism, together with the variations in the diameter of the car wheels, effects uniform distribution of the lubricant along the rail head.

It will be noted from the above disclosure that the construction of the valve plate 18 is such that no lubricant is expelled while the valve plate is in its depressed position. It will therefore be observed that no lubricant will be discharged from the apparatus in the event that a car wheel comes to rest over the discharge mechanism in a manner to hold the valve plate depressed for a considerable period. The supply passages 33 and 34 also supply the spring chamber 30 with lubricant, thereby insuring proper lubrication of the end portions of the valve plate 18.

Figure 10:
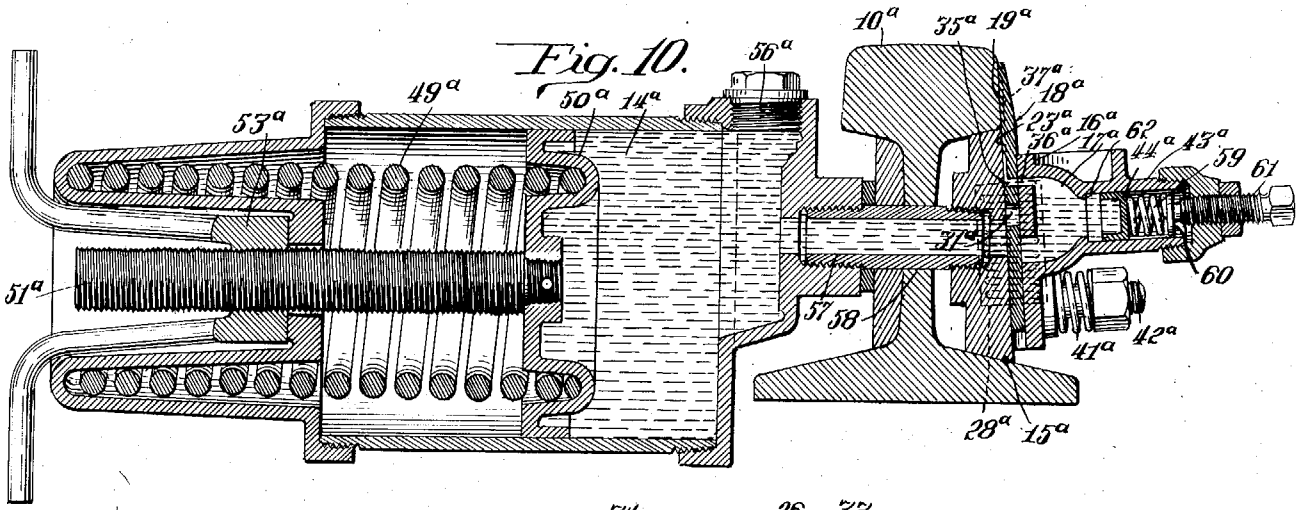
Fig. 10 is a cross-sectional view through a modified construction.
Figure 9:
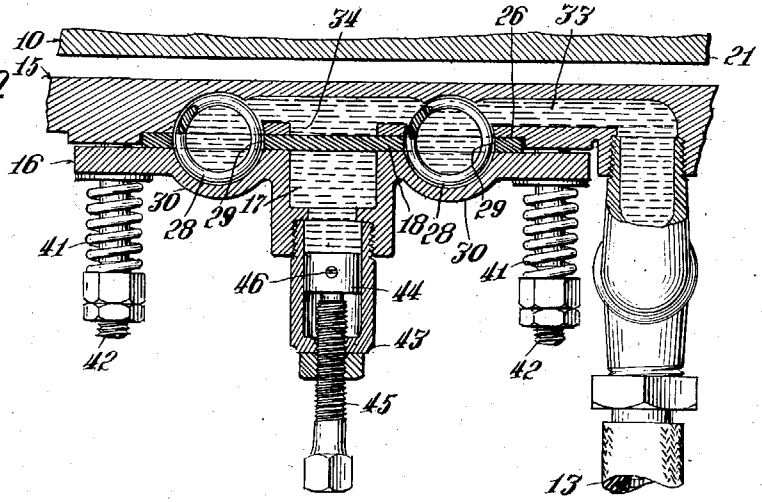
Fig. 9 is a longitudinal section taken on line 9—9 of Fig. 1 to illustrate the arrangement of the lubricant supply duct.

In Fig. 10 a modified embodiment is illustrated in which the main lubricant reservoir, as well as the auxiliary reservoir and discharge mechanism, is carried by the track rail instead of being embedded in the roadbed, as shown in the preceding embodiment. This modified construction shows also a spring pressed plunger associated with the auxiliary reservoir which is adapted to be displaced automatically by the pressure of the lubricant in the auxiliary reservoir and consequently provides a discharge mechanism particularly adapted for relatively non-compressible lubricant. It will be apparent that either of these constructions referred to generally might be readily embodied in the constructions previously described either with or without the adjustment of the discharge mechanism to fit different size rails.

In the modification the main reservoir for lubricant extends outwardly from the outside of the track and is supported on a supply conduit 57 which extends through an aperture 58 in the web of the track rail 10*a*. The main reservoir is provided with a spring pressed piston 50*a* which functions in substantially the same manner as that described in connection with the piston 50 of the previous embodiment to maintain continuous pressure on the body of lubricant in the main reservoir and in the supply conduit 57. The lubricant discharge mechanism includes a filler block 15*a* which is clamped in the space between the under surface of the rail head and the top surface of the base flange of the rail by virtue of its threaded engagement with the inner end of the supply conduit 57, the said block 15*a* being formed so that its outer face 23*a* will be in the plane of the inner surface 19*a* of the rail head. The wheel actuated valve plate 18*a* is of substantially the same construction as that previously described in connection with the previous embodiment and is held clamped resiliently in its operative position between the filler block 15*a* and the outer plate 16*a*, the latter of which is held in place by the springs 41*a* surrounding the studs 42*a* disposed in the same relative position as shown in Fig. 1 of the drawings. The member 16*a* is preferably formed with an extension 43*a* communicating with the auxiliary reservoir 17*a*. A plunger 44*a* is movably supported in the extension 43*a* so as to be automatically moved outwardly by the pressure of the lubricant in the auxiliary reservoir 17*a* to increase the capacity of said auxiliary reservoir; the pressure being exerted on the lubricant by means of the spring pressed piston 50*a* in the main reservoir 14*a*. The outward movement of the plunger 44*a* is resisted by a spring 59 interposed between the plunger and an abutment plate 60. The compression of the spring 59 and consequently the extent of the outward movement of the plunger 44*a* may be varied to suit the particular service conditions by adjustment of the screw 61. The amount of such adjustment will depend largely upon the character of the lubricant used and the amount of lubricant to be discharged. If a relatively compressible lubricant is used, the screw 61 may be adjusted to hold the plunger 44*a* against the seat 62. In such case, the expansive force of the lubricant will cause a quantity of lubricant to discharge through the passages 37*a* when the valve plate 18 is moved to open the discharge port 36*a*. If a less compressible lubricant is used, the screw 61 may be adjusted to permit some outward movement of the plunger 44*a*, such outward movement being produced by the pressure of the lubricant in the chamber 17*a*. In such case, both the expansive force of the lubricant and the recoil of the spring 59 function to force the lubricant through the discharge passages 37*a* when the discharge port is opened. If a relatively non-compressible lubricant is used, the screw 61 is adjusted to relieve the compression of the spring 59 and thereby permit greater outward movement of the plunger under the force of the lubricant in the chamber 17*a*. In such case, the recoil of the spring 59 in forcing the plunger toward its seat 62 will force a quantity of lubricant through the discharge passages 37*a* and onto the inner face of the rail head when the discharge port 36*a* is opened.

The valve plate 18*a* is returned to its normally elevated position by means of springs 28*a* in the same manner as described in connection with Figs. 1 to 9, inclusive, and by such movement brings the discharge opening 35*a* of the valve into register with the discharge port 36*a* so as to permit the discharge of lubricant through the discharge passages 37*a*, as above referred to.

The various other elements of the modified construction which correspond to similar constructions of the previous embodiment have been given the same reference characters with the addition of an exponent *a*.

While the invention is described in connection with two separate embodiments having interchangeable parts, it will be obvious that other modifications in structure might be made without departure from the spirit of the invention. It will be understood, therefore, that the invention contemplates all such structures coming within the scope of the appended claims.

I claim:

1. A rail lubricating mechanism comprising, in combination, a main reservoir for lubricant, an auxiliary reservoir having a variable capacity and provided with inlet and discharge ports, means for charging said auxiliary reservoir with lubricant under pressure from the main reservoir, and wheel actuated means for closing said inlet port and opening said discharge port to permit discharge of lubricant from said auxiliary reservoir.

2. A rail lubricating mechanism comprising, in combination, a main reservoir for lubricant, an auxiliary reservoir provided with inlet and discharge ports, means for adjustably varying the capacity of the auxiliary reservoir, means for charging said auxiliary reservoir with lubricant under pressure from the main reservoir, and wheel actuated means for closing said inlet port and opening said discharge port to permit discharge of lubricant from said auxiliary reservoir.

3. A rail lubricating mechanism comprising, in combination, a main reservoir for lubricant, an auxiliary reservoir provided with inlet and discharge ports, means for charging said auxiliary reservoir with lubricant under pressure from the main reservoir, means responsive to the pressure of the lubricant in said auxiliary reservoir for varying the capacity of said reservoir, and wheel actuated means for closing said inlet port and opening said discharge port to permit discharge of lubricant from said auxiliary reservoir.

4. A rail lubricating mechanism comprising, in combination, a main reservoir for lubricant, an auxiliary reservoir provided with inlet and discharge ports, means for charging said auxiliary reservoir with lubricant under pressure from the main reservoir, a wheel actuated means for closing said inlet port and opening said discharge port to permit discharge of lubricant from the auxiliary reservoir, and means in said auxiliary reservoir responsive to the pressure of the lubricant therein to increase the capacity of said reservoir and adapted upon opening of said discharge port to force lubricant out of said discharge port.

5. A rail lubricating mechanism comprising, in combination, a main reservoir for lubricant, an auxiliary reservoir provided with inlet and discharge ports, means for charging said auxiliary reservoir with lubricant under pressure from the main reservoir, wheel actuated means for closing said inlet port and opening said discharge port to permit discharge of lubricant, and means in said auxiliary reservoir responsive to the pressure of lubricant therein to increase the capacity of the said auxiliary reservoir and adapted upon the opening of said discharge port to force the lubricant therefrom, and means for varying the extent of movement of said pressure responsive member.

6. A rail lubricating mechanism comprising, in combination, a main reservoir for lubricant, an auxiliary reservoir, means for forcing the lubricant from the main reservoir into the auxiliary reservoir under pressure, a valve plate having an inlet port and positioned to be operated by a wheel passing along the rail to establish communication between said main and auxiliary reservoirs and having a discharge port adapted to move into communication with said auxiliary reservoir when the plate is in its normal position, and pressure means for varying the capacity of said auxiliary reservoir in accordance with the character of the lubricant used.

7. A rail lubricating mechanism comprising, in combination, a main reservoir for lubricant, an auxiliary reservoir, means for forcing lubricant from the main reservoir into the auxiliary reservoir, a valve plate having an inlet opening which establishes communication between the main and auxiliary reservoirs when the plate is depressed and having a discharge opening communicating with the auxiliary reservoir when the plate is in its normal elevated position, a plunger in said auxiliary reservoir, an adjusting screw for so positioning the plunger as to vary the capacity of said auxiliary reservoir in accordance with the character of lubricant used and the amount thereof required to be discharged.

8. A rail lubricating mechanism comprising, in combination, a main reservoir for lubricant, an auxiliary reservoir, means for forcing lubricant from the main reservoir into the auxiliary reservoir, a valve plate having an inlet opening which establishes communication between the main and auxiliary reservoirs when the plate is depressed and having a discharge opening communicating with the auxiliary reservoir when the plate is in its normal elevated position, a manually operable plunger in said auxiliary reservoir, and means for adjustably shifting the position of said plunger to vary the capacity of said auxiliary reservoir.

9. A rail lubricating mechanism comprising, in combination, a main reservoir for lubricant, a lubricant discharging mechanism adapted to be secured to a railroad rail and comprising a head portion having an auxiliary lubricant chamber therein, means for forcing lubricant from the main reservoir into the auxiliary reservoir, a valve plate operatively related to said auxiliary reservoir and adapted to be actuated by a car wheel, said plate having ports formed therein, one of said ports being provided to establish communication between said main and auxiliary reservoirs when the plate is depressed by the wheel, and the other of said ports being adapted to permit discharge of lubricant from said auxiliary reservoir when the plate is in its normal elevated position, and means in said auxiliary reservoir responsive to the pressure of the lubricant therein and adapted to force lubricant from said auxiliary reservoir in measured quantity when the said valve plate moves to its normal elevated position.

10. A rail lubricating mechanism comprising, in combination, a main reservoir for lubricant, a lubricant discharge mechanism adapted to be secured to a railroad rail and comprising a head member having an auxiliary lubricant chamber formed therein, a valve plate positioned in the path of movement of a wheel on the rail and formed with a port for establishing communication between the main and auxiliary reservoirs when said plate is depressed relative to the rail and formed with another port which, when the valve plate is in its elevated position, provides a discharge passage for lubricant from said auxiliary reservoir, means for charging the auxiliary reservoir with lubricant under pressure, and pressure exerting means in the auxiliary reservoir energized by the force exerted by said lubricant charging means and adapted, upon movement of said valve plate to cut off communication between the main and auxiliary reservoirs and to establish communication through said discharge port, to force a quantity of lubricant through said discharge port.

11. A rail lubricating mechanism comprising, in combination, a main reservoir for lubricant, an auxiliary lubricant reservoir supported on one side of a railroad rail, a valve plate adapted to be depressed by a wheel moving along said rail and having a port therein for establishing communication between said main and auxiliary reservoirs when the plate is depressed and having another port for communicating with said auxiliary reservoir when the plate is in its normal elevated position to permit discharge of lubricant onto the side of the rail head, a spring in said main reservoir for forcing lubricant therefrom into the auxiliary reservoir when said plate is depressed, a plunger in said auxiliary reservoir and a plunger operating spring of lesser strength than the spring in the main reservoir adapted when the said valve plate is moved to its normal elevated position to move said plunger in a direction to force lubricant from the auxiliary reservoir onto the side of the rail head.

12. A rail lubricator mechanism comprising, in combination, a main reservoir for lubricant positioned at a location remote from the rail, a lubricant discharge mechanism secured to the rail and having a portion providing an auxiliary reservoir for lubricant, a conduit connecting said main and auxiliary reservoirs, a valve plate positioned to be depressed by engagement of the wheel passing on the rail and having a port for opening communication between said main and auxiliary reservoirs when the said plate is depressed and provided with discharge passages which communicate with the auxiliary reservoir when the valve plate is returned to its normal raised position, springs for returning the plate to its raised position, means for holding the auxiliary reservoir portion resiliently against the valve plate, and means operable in the auxiliary reservoir for varying the capacity of said auxiliary reservoir.

13. A rail lubricating mechanism comprising, in combination, a main reservoir for lubricant, a lubricant discharging mechanism supported on a rail comprising an auxiliary reservoir, a valve plate positioned flat against one side of the rail head to be depressed by engagement with a wheel passing on the rail and having a port therein which establishes communication between the main and auxiliary reservoirs when the plate is depressed and having discharge passages communicating with the auxiliary reservoir when the plate is returned to its normal elevated position, springs for returning the said plate to its upper position, means providing vertical and angular adjustment of said valve plate relative to the rail, a plunger in said auxiliary reservoir and manually operable adjusting means for shifting the position of said plunger to vary the capacity of said auxiliary reservoir.

14. A rail lubricating mechanism comprising, in combination, a main reservoir for lubricant, a lubricant discharge mechanism secured to the rail and comprising a compression chamber, means for resiliently supporting said compression chamber portion on the rail, a combined valve plate and lubricant distributor positioned against the rail head and having a plurality of upwardly diverging discharge passage ways formed on its rear face and having a port for establishing communication between said passage ways and said auxiliary reservoir when the valve plate is in its elevated position, there being a port in said plate for establishing communication between said main and auxiliary reservoirs when the plate is depressed relative to the rail, a spring for applying pressure to the lubricant in the main reservoir and adapted when the valve plate is depressed to force lubricant from the main reservoir into the auxiliary reservoir, a spring pressed plunger in said auxiliary reservoir adapted to yield under the pressure of the lubricant therein when the discharge passages are closed and adapted to exert pressure to force lubricant out of said auxiliary reservoir through said passages when the said plate is moved to its normal elevated position.

15. A rail lubricating mechanism comprising, in combination, a main reservoir for lubricant, an auxiliary reservoir, means for forcing lubricant from the main reservoir into the auxiliary reservoir, a valve plate having an inlet opening which establishes communication between said main and auxiliary reservoirs when the plate is depressed and having a discharge opening communicating with the auxiliary reservoir when the plate is in its normal elevated position, a spring pressed plunger in said auxilary reservoir responsive to the pressure of lubricant therein to increase the capacity of said auxiliary reservoir and to force the lubricant therefrom when the said valve plate is raised to its normal elevated position.

16. A rail lubricating mechanism comprising, in combination, a main reservoir for lubricant, an auxiliary reservoir, means for forcing lubricant from the main reservoir into the auxiliary reservoir, a valve plate having an inlet opening which establishes communication between the main and auxiliary reservoirs when the plate is depressed, and having a discharge opening communicating with the auxiliary reservoir when the plate is in its normal elevated position, a spring pressed plunger in said auxiliary reservoir responsive to the pressure of lubricant therein to increase the capacity of said auxiliary reservoir and to force the lubricant therefrom when the said valve plate is raised to its normal elevated position, and means for adjustably limiting the movement of said plunger.

HARRY B. BATES.